United States Patent
Gong

Patent Number: 5,124,847
Date of Patent: Jun. 23, 1992

[54] REAR VIEW MIRROR

[76] Inventor: Qi Hua Gong, 4631 G. St., Philadelphia, Pa. 19120

[21] Appl. No.: 660,448

[22] Filed: Feb. 22, 1991

[30] Foreign Application Priority Data

Jul. 31, 1990 [CN] China ............... 90102908.4

[51] Int. Cl.⁵ ............................................. G02B 5/08
[52] U.S. Cl. ............................ 359/854; 359/865
[58] Field of Search ............ 359/854, 865, 841, 844, 359/850

[56] References Cited

U.S. PATENT DOCUMENTS

| | | | |
|---|---|---|---|
| D. 226,845 | 5/1973 | Lapidus. | |
| 1,969,415 | 8/1934 | Ostroff | 359/854 |
| 3,588,233 | 6/1971 | Lambert. | |
| 3,771,854 | 11/1973 | Roark | 359/854 |
| 3,954,328 | 5/1976 | Ames | 359/865 |
| 4,486,075 | 12/1984 | Cohen | 359/865 |
| 4,695,138 | 9/1987 | Epstein | 359/854 |
| 4,718,756 | 1/1988 | Lancaster | 359/865 |
| 4,852,986 | 8/1989 | Yu | 359/865 |
| 5,007,724 | 4/1991 | Hou | 359/841 |

FOREIGN PATENT DOCUMENTS

| | | |
|---|---|---|
| 2444277 | 4/1975 | Fed. Rep. of Germany. |
| 3228718 | 9/1983 | Fed. Rep. of Germany. |
| 2410581 | 8/1979 | France. |
| 2588808 | 4/1987 | France. |

*Primary Examiner*—Carolyn E. Fields
*Assistant Examiner*—Drew A. Dunn
*Attorney, Agent, or Firm*—Paul & Paul

[57] ABSTRACT

An adjustable wide angle inside rear view mirror includes a stationary central mirror and a pair of extensible side mirrors which can be pulled out so that the driver has a view of other vehicles in the "blind spots" on either side of a conventional rear view mirror. The side mirrors are interconnected so that both side mirrors are extended when either one of the side mirrors is extended manually. The extension of the side mirrors is continuously adjustable, but the amount of travel is limited so that the side mirrors can be pulled out only about three-quarters of their length. The wide angle rear view mirror can be retracted to permit the driver to adjust the position of the car's sun visors, and then reextended.

11 Claims, 4 Drawing Sheets

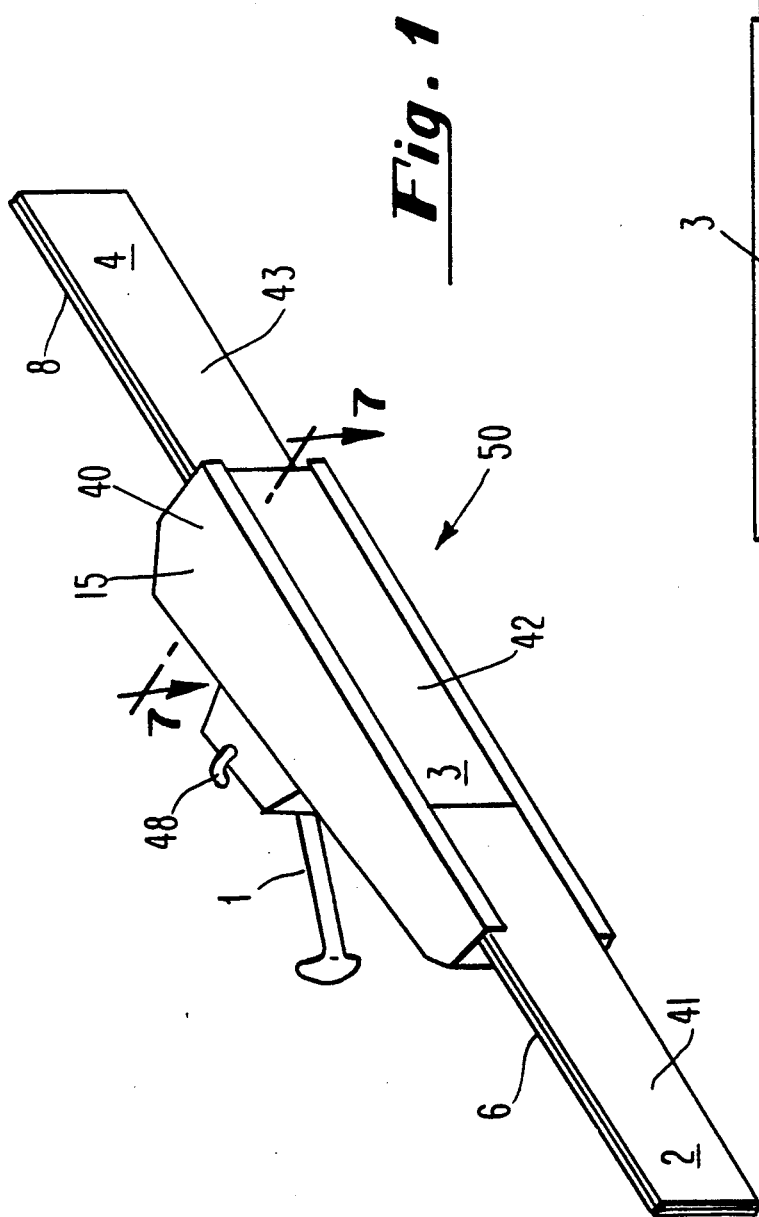
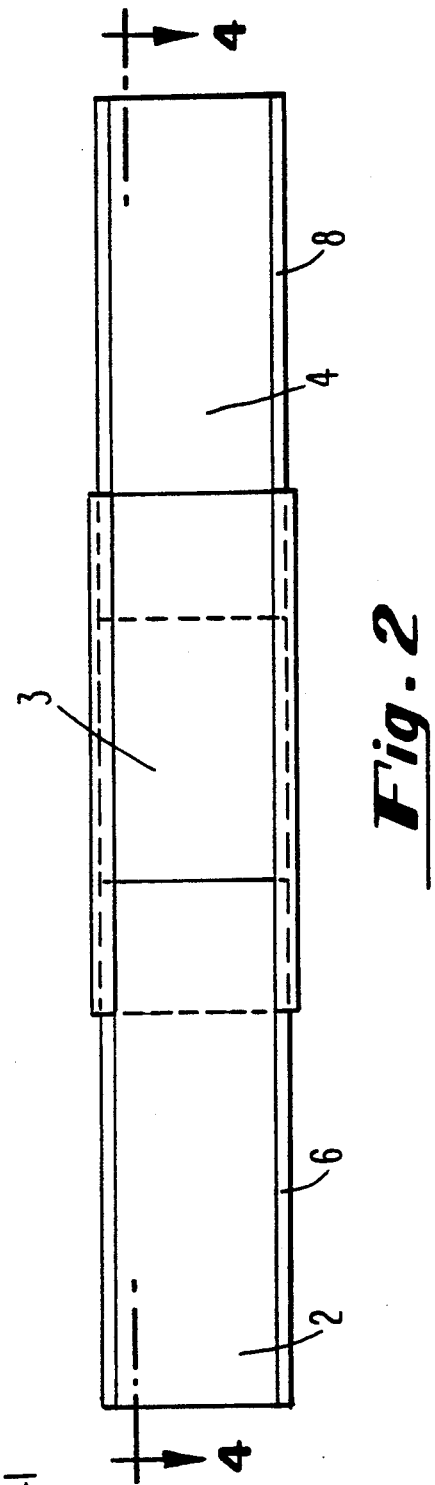
Fig. 1
Fig. 2

REAR VIEW MIRROR

BACKGROUND OF THE INVENTION

1. Field of the Invention

The present invention relates to accessories for motor vehicles, and more particularly to mirrors for improving the visibility of objects behind the driver of a motor vehicle.

2. Brief Description of the Prior Art

To drive safely, a motor vehicle driver requires as much information as possible about the existence, location and speed of other vehicles in his or her vicinity. Information about vehicles behind the driver is usually provided by glancing in mirrors, conventionally an interior rear view mirror, supplemented with one or two exterior mirrors, adjusted to view "blind spots," that is, areas not within view of the interior rear view mirror. However, consistently using several rear view mirrors can be difficult under adverse conditions, such as heavy traffic or inclement weather, when the driver's attention must be otherwise focused. The difficulty of using several rear view mirrors can become greater as a driver ages.

Conventional interior rear view mirrors for motor vehicles are adjustable to suit the height and seat position of the driver, as well as for day and night driving conditions. However, conventional interior rear view mirrors do not provide a view of the "blind spots" for which exterior mirrors are provided. A simple way to permit the driver to view the "blind spots" in the interior rear view mirror is by extending the width of that mirror.

U.S. Pat. No. 1,969,415 discloses a three-section rear mirror in which the two wings are linked extendibly to the central mirror by separately adjustable tongs. Each wing can be adjusted angularly. However, when the wings are extended, the mirror does not provide a continuous view, but instead has its own "blind spots."

U.S. Pat. No. 3,954,328 discloses a rear view mirror having a single slidably extensible auxiliary mirror, which is also angularly adjustable. However, this device only provides a view of one of the two "blind spots" on either side of the central mirror.

U.S. Pat. No. 4,695,138 discloses a rear view mirror having a pair of wing mirrors hinged to a central flat mirror, the wing mirrors being flat, except towards their outside edges, where they are convex. Depending on the width of the entire mirror assembly, the wings may interfere with use of the sun visors which are conventionally mounted on either side of the rear view mirror.

U.S. Pat. No. Des. 226,845 shows a design for an automotive rear view mirror having three separate panels.

U.S. Pat. No. 3,588,233 shows an extensible sun-visor mirror, having a front mirror which can be pulled down to reveal a rear mirror, the combination providing a large reflective surface for personal grooming.

Despite the efforts made at providing an interior rear view mirror which provides a view of the "blind spots" on either side of conventional interior rear view mirrors, there is a continuing need for such a mirror, especially one which can be used without interfering with the operation of the sun visors which are conventionally provided.

SUMMARY OF THE INVENTION

The present invention provides an adjustable wide angle inside rear view mirror having a stationary central mirror and a pair of extensible side mirrors, the side mirrors being interconnected so that both side mirrors are extended when either one of the side mirrors is extended manually. The present invention provides a rear view mirror that has a width which can be steplessly or continuously adjusted.

Prior art wide angle inside rear view mirrors typically consist of a bracket and a frame, in which 3-6 or more sections of mirror are mounted, such that the width of the whole mirror cannot be changed. These prior art mirrors occupy a lot of space in the interior of the motor vehicle, and hinder the operation of the sunshade or sun visor. Nor can these prior art mirrors be matched to the individual needs of each driver, such as some elderly drivers who benefit from being able to employ a wide angle rear view mirror frequently.

The present invention overcomes the shortcomings of these prior art wide angle rear view mirrors by providing a wide angle rear view mirror which can be adjusted continuously from a fully closed position in which the adjustable mirror mimics standard rear view mirrors to a fully extended position.

The adjustable wide angle inside rear view mirror of the present invention includes a stationary central reflective element, and a first and a second extensible side reflective element. The side reflective elements are interconnected so that both side reflective elements are extended when either one of the side reflective elements is extended manually. The extension of the side reflective elements is continuously adjustable.

Preferably, the extensible reflective elements are interconnected by a plurality of flexible cords. Each cord can extend from the second extensible reflective element, through a first aperture in the stationary reflective element, through a first and a second aperture in the first extensible reflective element, back through a second aperture in the stationary reflective element, and to the second extensible reflective element. Each reflective element is preferably generally rectangular and has a pair of ends, with the extensible reflective elements each having an inner end and an outer end. The first and second apertures in the stationary reflective element are positioned proximate respective ends of the stationary reflective element, and the first and second apertures in the first extensible reflective element are positioned proximate the outer end of the first extensible reflective element.

The inside rear view mirror preferably includes a box-like frame having a plurality of parallel upper and lower grooves for receiving the reflective elements. Preferably, both the upper grooves and the lower grooves each include a front, a middle and a rear groove, and the stationary reflective element is fixedly mounted in the middle grooves, with the front and rear reflective elements being movably mounted in the front and rear respective grooves.

Preferably, means are provided for limiting the outermost extension of the extensible reflective elements, so that they may be extended no more than about three-quarters of their length, so as to limit the adverse effects of vibration.

It is also preferred that the box-like frame include a generally planar back, the grooves being formed an angle of about 10 to 15 degrees to the back, so that the back of the mirror will not contact the inside of the windshield when it is being adjusted to to suit the driver.

In one embodiment, the inside wide angle rear view mirror is provided with a conventional mounting bracket for attaching the mirror as original or replacement equipment to the dash, the inside of the windshield of the motor vechicle, or to the inside of the roof, just above the windshield, as is conventional. In another embodiment, the mirror of the present invention is provided with a plurality of mounting means for attaching the wide angle mirror over an existing rear view interior mirror.

BRIEF DESCRIPTION OF THE DRAWINGS

FIG. 1 is a perspective view of a rear view mirror according to the present invention showing the reflective elements in the fully extended position.

FIG. 2 is a front elevational view of the rear view mirror of FIG. 1.

DETAILED DESCRIPTION

Figure 3A:
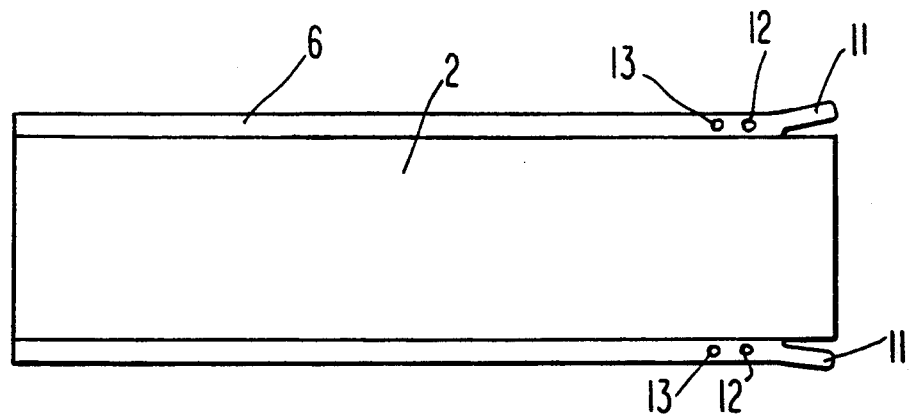
FIGS. 3a, 3b and 3c are front elevational views of the reflective elements of the rear view mirror of FIG. 1.

Referring now to the drawings in detail, where like reference numerals refer to like elements in each of the several views. Shown in FIG. 1 is a perspective view of a rear view mirror 50 according to the present invention shown fully extended. The rear view mirror 50 includes a box-like frame 40 in which are mounted three reflective elements 41, 42, and 43, a rear view mirror mounting element 1 and a day/night switch 48. Each reflective element 41, 42, 43 includes a respective mirror 2, 3, 4 secured to a plastic mounting plate 6, 7 (not visible in FIG. 1), 8. The reflective elements 41, 42, 43 are mounted in the frame 40 in respective parallel tracks (not visible in FIG. 1) to prove a stationary middle reflective element 42, an extendible front reflective element 41 and an extendible rear reflective element 43. The rear view mirror 50 is continuously extendible from a fully closed to the fully extended position show in FIG. 1 and the front elevational view of FIG. 2. In the fully extended position shown in FIGS. 1 and 2, the rear view mirror 50 provides a wide angle view for the driver, up to two and one-half times the view of the mirror 50 in the fully closed position.

Figure 3B:
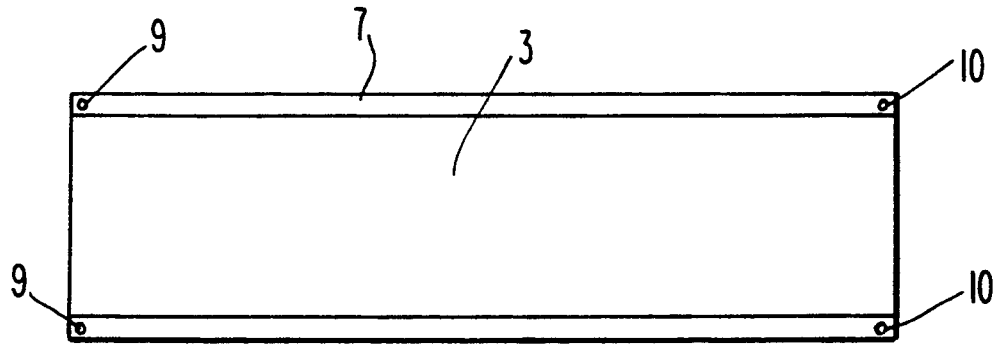
Figure 3C:
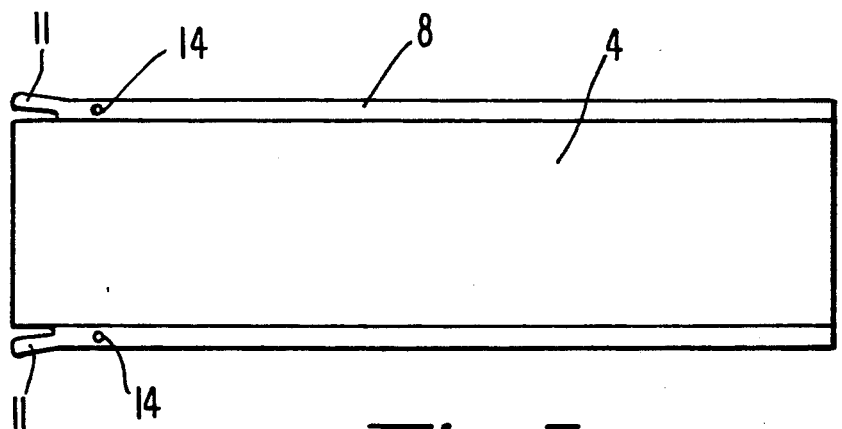

As best seen in the front elevational views of FIGS. 3a, 3b, and 3c, the reflective elements 41, 42, and 43 include mirrors 2, 3, 4 adhered separately to three oblong plastic mounting plates 6, 7, 8. The mirrors 2, 3, 4 can be glass or plastic. If desired, the plastic mounting plates 6, 7, 8 can be replaced with frames for each mirror (not shown). The height of each plastic mounting plate 6, 7, 8 is little greater than that of the respective mirror 2, 3, 4, so that portions of the plastic mounting plates extend above and below the mirrors 2, 3, 4, for movable engagement in channel provided in the box-like frame 40, best seen in the side sectional view of FIG. 7.

As shown in FIG. 3b there are four apertures 9, 10 formed in oblong plastic mounting plate 7 of the middle reflective element 42, one aperture proximate each corner of the plastic mounting plate 7, apertures 9 being on the left side, apertures 10 being on the right side as shown in FIG. 3b. As shown in FIG. 3a, the left side of the plastic mounting plate 6 of the front reflective element 41 at the upper and lower corners has a pair of elastic supports or biasing elements 11 formed on the plastic mounting plate 8, and there are two horizontally spaced apertures 12, 13 formed in the plastic mounting plate 6 near the supports 11. As shown in FIG. 3c, the rear reflective element 43 has a pair of supports or biasing elements 11, as well as two apertures 14 formed in the oblong plastic mounting plate 8, each proximate a respective support 11. The rear view mirror 50 is operable by means of a pair of cords 5 extending through the apertures 14 formed in the reflective elements 41, 43 and arranged so that when the driver manually exends or retracts either the front reflective element 41 or the rear reflective element 43, the other respective reflective element automatically extends or retracts.

The supports or biasing elements 11 provide an antivibration function, and serve to reduce vibrations transmitted from the road and motor vehicle to the movable reflective elements 41, 43, especially when the movable reflective elements 41, 43 are fully extended.

The bias of the supports 11 can be provided by the following heat treatment steps, assuming the plastic plates are formed from a thermoformable material. The first step is making a slit to form the support (not shown); then the lateral support (not shown) is heated to the temperature that the support can be bent, and the support is bent in the lateral direction to form an angle about 10°.

Figure 4:
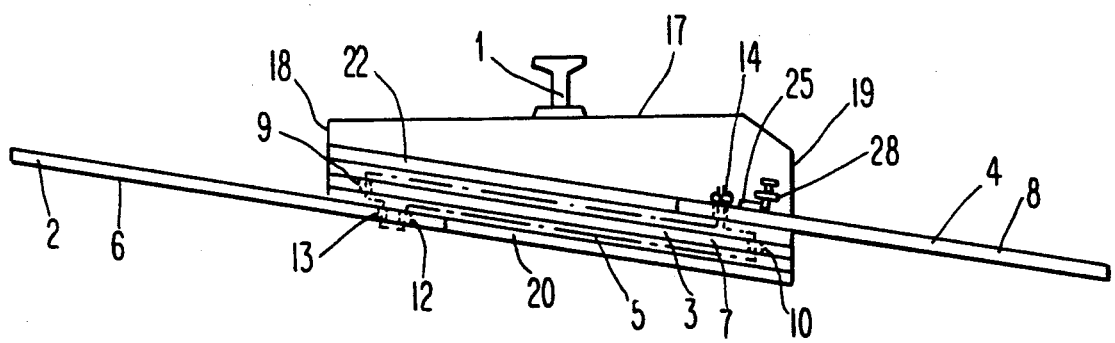
FIG. 4 is a sectional plan view of the rear view mirror of FIG. 2 shown through section A—A.

The arrangement of the cords 5 is best seen in FIG. 4, a plan sectional view showing the rear view mirror 50 in a fully extended position. A first end of the upper cord 5 is secured to, and extends from, the back of the plastic mounting plate 8 through an aperture 14 in the rear reflective element 43 proximate the upper edge of the plastic mounting plate 8, then extends through an aperture 10 at one end of the plastic mounting plate 7 of the middle reflective element 42, and next through an aperture 12 in the plastic mounting plate 6 of the front reflective element 41. The upper cord 5 then extends back through another aperture 13 of the same plastic mounting plate 6 of the front reflective element 41, and from there through an aperture 9 on the other side of the plastic mounting plate 7 of the middle reflective element 42, and finally back through the initial aperture 14 of the plastic mounting plate 8 of the rear reflective element 43, the second end of the cord 5 also being secured to the rear of the plastic mounting plate 8 of the rear reflective element 43. The cord ends can be secured in the plastic mounting plate 8 by conventional means, such as adhesively, by screws, or the like. The lower cord 5 extends in like manner through respective apertures positioned in the plastic mounting plates proximate their lower edges.

Movement of the front and rear reflective elements 41, 43 is effected and coordinated by the cords 5. The upper and lower cords 5 form continuous belts which can move around the middle reflective element 42. The apertures 12, 13 in the front reflective element 41 provide a joint for linking the front reflective element 41 with the cords 5, and the apertures 14 provide a joint for linking the rear reflective element 43 with the cords 5. If the front reflective element 41 is pulled out from the left side, simultaneously, the rear reflective element 43 will become extended from the right side by the cords 5. Similarly, if the front reflective element 41 is pushed into the frame 40, the rear reflective element 43 will be pulled into the frame 40. Similarly, the rear view mirror 50 can be operated by extending or retracting the rear reflective element 43, the front reflective element 41 being simultaneously extended or retracted by means of the cords 5.

Figure 5:
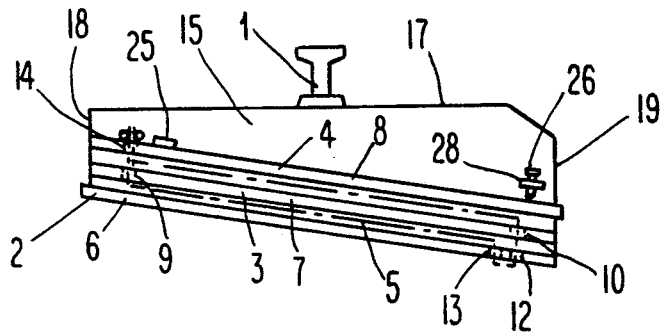
FIG. 5 is a sectional plan view of the rear view mirror of FIG. 2 shown through section A—A with the reflective elements in the closed position.

FIG. 5 provides a sectional plan view of the rear view mirror 50 shown in the fully closed position, showing the position of the upper cord 5.

Figure 6:
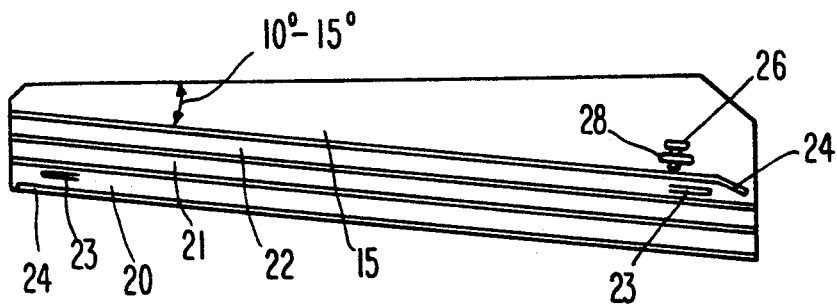
FIG. 6 is a bottom plan view of the upper frame member of the rear view mirror of FIG. 1 showing the multiple mirror tracks.
Figure 7:
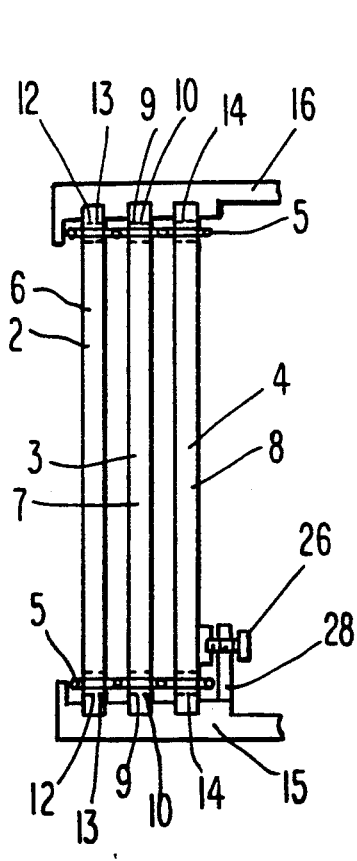
FIG. 7 is a side sectional elevational view of the rear view mirror of FIG. 1 shown through the section 7—7.

As shown in FIG. 4, the frame 40 includes a back wall 17, left side 18, and a right side 19, as well as a bottom 15 and a top 16 (FIG. 7). The bottom 15 is the symmetric, mirror image of the lop 16. As best seen in the fragmentary side, elevational sectional view of FIG. 7. In the forward part of the bottom 15 and the top 16 there are three parallel concave grooves 20, 21, 22. These concave grooves 20, 21, 22 are not parallel to the back wall 17, but as shown in the plan sectional view of FIG. 6, there is an acute angle about 10°-15° between the back wall 17 of the frame 40 and the grooves 20, 21, 22. In the front of the bottom 15, within the left end of the front concave groove 20 and the right end of the rear concave groove 22 there are elastic supports or biasing elements 23, 24 for reducing vibration of the front and rear reflective elements 41, 43 in the respective front and rear concave grooves 20, 22, especially when these elements are fully extended. The plastic mounting plates 6, 7, 8 are separately placed into respective concave grooves 20, 21, 22, the plastic mounting plate 7 of the center reflective element 42 being securely fixed in the middle concave groove 21, with adhesive or the like.

Usually, the windshield of the motor vehicle or car (not shown) and the rear view mirror 50 are not parallel, because the driver will adjust the angle between them for observing both sides of the car as well as possible. To prevent the fully extended rear view mirror 50 from touching the windshield, the reflective elements 41, 42, 43 are mounted at an angle of about 10°-15° with respect to the back wall 17 of the frame 40.

Figure 8:
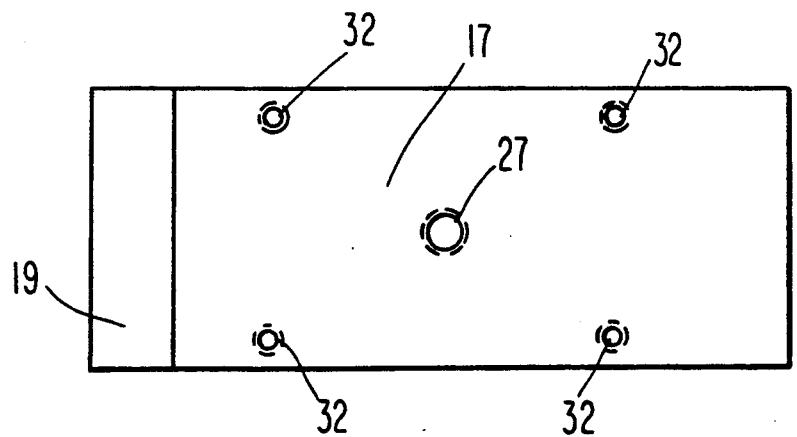
FIG. 8 is a rear elevational view of the rear view mirror of FIG. 1 with the mounting bracket omitted for clarity.

As shown in the back elevational view of FIG. 8, in the center of the back wall 17 here is a threaded hole 27 for receiving a conventional rear view mirror mounting bracket 4 (FIG. 1).

The movement of the reflective elements 41, 43 in the rear view mirror 50 is limited. If the side reflective elements are pulled out too far, such as more than about seven-tenths to eight-tenths their length, excessive vibration can occur, providing unacceptable distortion. When the front reflective element 41 or the rear reflective element 43 is pulled out about three-quarters the length of the element, a limiting device will prevent it from being pulled out any further. The limiting device consists of a stop 25 secured to the rear of the plastic mounting plate 8 of the rear reflective element 43, the stop 25 being positioned to be engaged by a screw 26 mounted in a bracket 28 when the rear reflective element 43 has been extended outward about three quarters of its length. The bracket 28 is secured to the bottom 15 of the frame 40.

Figure 9A:
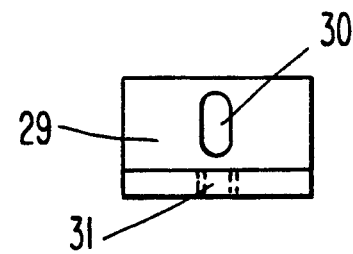
FIGS. 9a, 9b and 9c are respectively plan, front elevational, top elevational and side elevational views of an attachment bracket for the rear view mirror of FIG. 1.
Figure 9B:
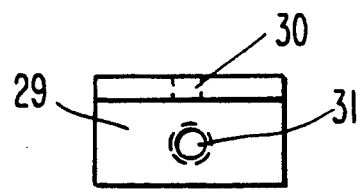
Figure 9C:
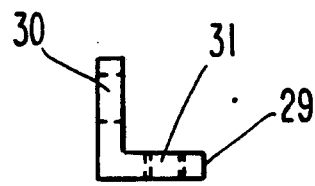

The rear view mirror 50 of the present invention can optionally be fitted four mounting brackets 29 (FIGS. 9a, 9b, 9c), each mounting bracket 29 having an "L" shape, with an aperture 30, 31 in each plate of the "L". If the motor vehicle already has an inside rear view mirror (not shown), the mounting brackets 29 are used to mount the rear view mirror 50 of the present invention on the frame of the original one. The aperture 30 in the mounting brackets 29 is oblong, the other aperture 31 being circular and threaded to receive a screw. The mounting brackets 29 are secured to the back 17 of the frame 40 (FIGS. 9a, 9b, 9c) by screws extending through the oblong aperture 30, permitting the mounting brackets 29 to be adjusted to securely engage the existing rear view mirror (not shown). After the mounting brackets 29 have been adjusted and secured to the frame 40, the adjustable rear view mirror 50 is placed over the existing mirror (not shown) and secured by tightening the screws extending through the threaded holes 32 in the mounting brackets 29.

The angle at which the reflective elements 41, 42, 43 are mounted with respect to the back of the frame 40 depends on which side of the motor vehicle the driver is sitting, the drawings showing a mirror 50 adapted for a vehichle in which the driver sits on the left side of the vehicle.

Various modifications can be made in the details of the above-described embodiments of the apparatus of the present invention, all within the spirit and scope of the invention as defined by the appended claims.

I claim:

1. An adjustable wide angle inside rear view mirror including:
   a) a stationary central reflective element; and
   b) a first and a second extensible side reflective element, the side reflective elements being interconnected so that both side reflective elements are extended when either one of the side reflective elements is extended manually, the extension of the side reflective elements being continuously adjustable.

2. An inside rear view mirror according to claim 1 in which the extensible reflective elements are interconnected by a plurality of flexible cords.

3. An inside rear view mirror according to claim 2 in which each cord extends from the second extensible reflective element, through a first aperture in the stationary reflective element, through a first and a second aperture in the first extensible reflective element, back through a second aperture in the stationary reflective element, and to the second extensible reflective element.

4. An inside rear view mirror according to claim 3, in which each reflective element is generally rectangular and has a pair of ends, the extensible reflective elements each having an inner end and an outer end, the first and second apertures in the stationary reflective element being positioned proximate respective ends of the stationary reflective element, the first and second apertures in the first extensible reflective element being positioned proximate the outer end of the first extensible reflective element.

5. An inside rear view mirror according to claim 4 further comprising a box-like frame, the frame having a plurality of parallel upper and lower grooves for receiving the reflective elements.

6. An inside rear view mirror according to claim 5 in which a plurality of parallel upper grooves comprise a front, a middle and a rear groove, the plurality of parallel lower grooves comprising a front, a middle and a rear respective groove, the stationary reflective element being fixedly mounted in the middle grooves, and the front and rear reflective elements being movably mounted in the front and rear respective grooves.

7. An inside rear view mirror according to claim 6 further comprising means for limiting the outermost extension of the extensible reflective elements.

8. An inside rear view mirror according to claim 1 wherein each reflective element comprises a mirror and a mirror mounting element.

9. An inside rear view mirror according to claim 5 wherein the box-like frame include a generally planar back, the grooves being formed an angle of about 10 to 15 degrees to the back.

10. An inside rear view mirror according to claim 1 further comprising mounting means for attaching the inside wide angle rear view mirror to an existing rear view mirror.

11. An adjustable wide angle inside rear view mirror including:
   a) a stationary central reflective element;
   b) a first and a second extensible side reflective element, the side reflective elements being interconnected so that both side reflective elements are extended when either one of the side reflective elements is extended manually, the extension of the side reflective elements being continuously adjustable;
   c) a box-like frame, the frame having a plurality of parallel upper and lower grooves for receiving the reflective elements; and
   d) means for limiting the outermost extension of the extensible reflective elements.

* * * * *